United States Patent
Kusunoki

(10) Patent No.: US 11,761,495 B2
(45) Date of Patent: Sep. 19, 2023

(54) CAM CLUTCH

(71) Applicant: TSUBAKIMOTO CHAIN CO., Osaka (JP)

(72) Inventor: Sota Kusunoki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/894,731

(22) Filed: Aug. 24, 2022

(65) Prior Publication Data
US 2023/0068029 A1   Mar. 2, 2023

(30) Foreign Application Priority Data
Aug. 31, 2021   (JP) .................. 2021-141508

(51) Int. Cl.
  *F16D 41/07*   (2006.01)
  *F16D 41/06*   (2006.01)

(52) U.S. Cl.
  CPC ...... *F16D 41/07* (2013.01); *F16D 2041/0603* (2013.01)

(58) Field of Classification Search
  CPC .. F16D 41/07; F16D 41/08; F16D 2041/0603; F16D 2041/0605; F16D 2041/0601
  See application file for complete search history.

(56) References Cited

U.S. PATENT DOCUMENTS

| | | | |
|---|---|---|---|
| 4,693,351 A | | 9/1987 | Adolfsson |
| 4,771,873 A | * | 9/1988 | Kinoshita ............... F16D 41/07 384/129 |
| 5,404,976 A | * | 4/1995 | Lihrmann ............... F16D 41/07 192/48.92 |
| 2011/0127134 A1 | * | 6/2011 | Iwano .................. F16D 41/105 192/41 S |
| 2013/0319811 A1 | * | 12/2013 | Kato .................... F16D 41/084 192/45.1 |
| 2019/0257374 A1 | * | 8/2019 | Watanabe ............... F16D 41/07 |

FOREIGN PATENT DOCUMENTS

| | | |
|---|---|---|
| JP | S62-52227 A | 3/1987 |
| JP | 2014020439 A * | 2/2014 |
| JP | 2011-231828 A | 11/2021 |

* cited by examiner

*Primary Examiner* — Lori Wu
(74) *Attorney, Agent, or Firm* — WHDA, LLP

(57) ABSTRACT

The present invention aims at providing a cam clutch that prevents cams from unwanted wedging and enables smooth operation including the switching between operation modes without involving an increase in size or number of components and with a simple structure. The cam clutch according to the present invention uses first cams and second cams having different engaging directions as sprags for transmitting and interrupting torque between an inner race and an outer race. A cam interlock mechanism tilts the second cams to a disengaging direction with a tilting motion of the first cams toward an engaging direction, to separate engaging surfaces of the second cams from raceways of the inner race and/or the outer race.

7 Claims, 11 Drawing Sheets

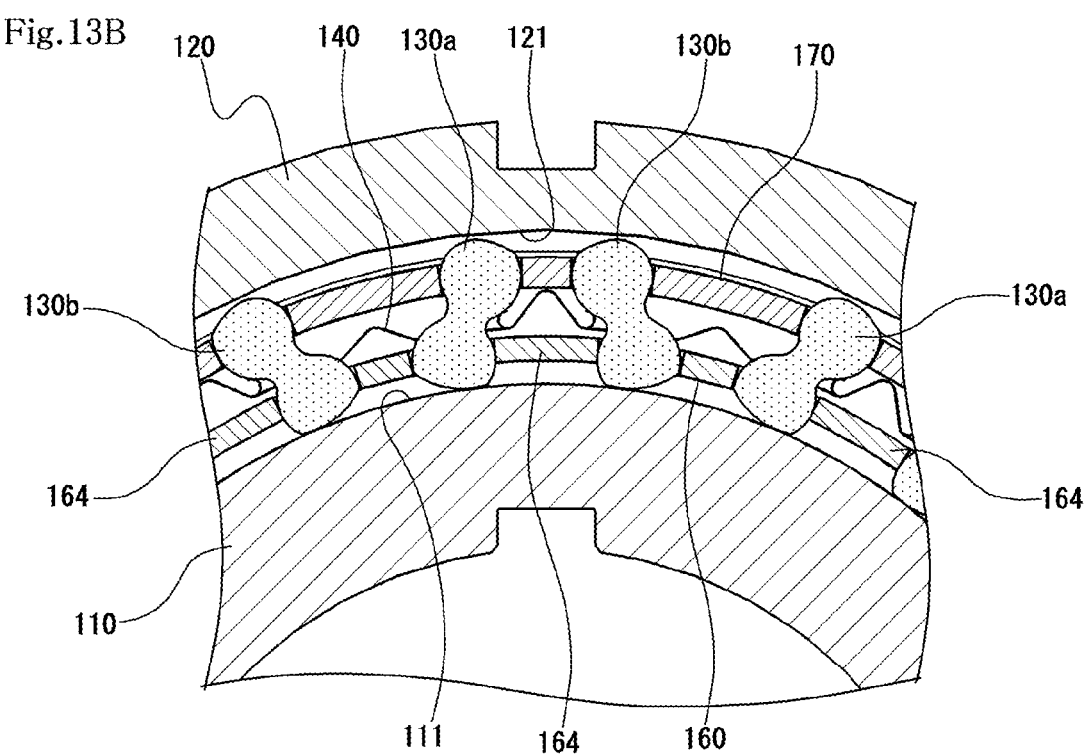

CAM CLUTCH

BACKGROUND OF THE INVENTION

1. Field of the Invention

The present invention relates to a cam clutch configured to be switchable between a free mode and a lock mode, for example, the former allowing relative rotation of an outer race and an inner race in both directions and the latter prohibiting relative rotation of the outer race and inner race in one or both of forward and reverse directions.

2. Description of the Related Art

As one type of clutch that controls transmission and interruption of a rotary force, two-way switchable clutches that can drive and freewheel in both forward and reverse directions are known.

Japanese Patent Application Publication No. 2011-231828, for example, describes a clutch configured to be switchable between three operation modes, i.e., a two-way free mode allowing rotation in both forward and reverse directions, a one-way lock mode allowing rotation only in the forward direction and prohibiting rotation in the reverse direction, and a one-way lock mode allowing rotation only in the reverse direction and prohibiting rotation in the forward direction, by controlling a retainer that retains both first sprags and second sprags, which are biased by biasing means toward opposite locking directions in which they prohibit relative rotation.

Japanese Patent Application Publication No. S62-52227, for example, describes a cam clutch having sprags that engage in one rotating direction and sprags that engage in the other rotating direction alternately and oppositely arranged on the same circle and held by a shared retainer.

SUMMARY OF THE INVENTION

In the two-way clutch described above, the two groups of sprags are biased to be in contact with the inner race and outer race so that one group of sprags immediately tilt and start wedging against the inner race and outer race upon torque input to the inner race or outer race, while the other group of sprags remain in sliding contact with the inner race and outer race and are kept standby.

When the torque is removed, the wedging group of cams tilt in the disengaging direction to switch to a freewheeling state. At this time, there is a possibility that the other group of sprags tilt in the engaging direction and start wedging against the inner race and outer race before the wedging group of cams are disengaged, whereupon "jamming" or unwanted wedging can occur in which all the cams are engaged at the same time.

When this happens, all the sprags are engaged with a high surface contact, so that a large force is required to change the postures of the sprags to switch the operation mode of the cam clutch from the lock mode that prohibits relative rotation of the outer race and inner race in one or both of forward and reverse directions to the free mode that allows relative rotation of the outer race and inner race in both directions, which may be detrimental to the engaging surfaces of the sprags in contact with the inner race and outer race or the raceways of the inner race and outer race, and may shorten the service life of the cam clutch. In addition, posture change members provided for changing the postures of the sprags need to have high rigidity.

In the case of using the outer race as the input-side rotating body, the posture change members need to rotate in sync with the outer race when switching over operation modes because of the need to move the posture change members in the circumferential or radial direction, or other directions including these directions.

Moreover, the cam clutch requires a separate mechanism for switching over operation modes, which leads to an increase in size and number of components, and a lower holding torque.

The present invention was made based on the circumstances described above and aims at providing a cam clutch that prevents the cams from unwanted wedging and enables smooth operation including the switching between operation modes without involving an increase in size or number of components and with a simple structure.

The present invention solves the above problem by providing a cam clutch including: an inner race and an outer race that are coaxial and rotatable relative to each other; a plurality of cams circumferentially arranged at intervals between the inner race and the outer race; and a biasing means biasing each of the plurality of cams to make contact with the inner race and the outer race, the plurality of cams including first cams and second cams that wedge against the inner race and the outer race in different directions from each other, the cam clutch further including a cam interlock mechanism that tilts each of the plurality of cams in a coordinated manner, the cam interlock mechanism being configured to tilt the second cams in a disengaging direction with a tilting motion of the first cams in an engaging direction to separate an engaging surface of the second cams from a raceway of the inner race and/or a raceway of the outer race.

According to the invention set forth in claim 1, the tilting motion of the first cams that wedge against the inner race and outer race when torque is applied to the inner race or the outer race is coordinated with a tilting motion of the second cams, which are normally kept standby, in the disengaging direction to separate the engaging surface of the second cams from the raceway of the inner race and/or the raceway of the outer race. Therefore, even though the second cams tilt in the engaging direction when the torque is removed, the second cams do not start wedging against the inner race and outer race before the first cams are disengaged. Thus smooth operation can be realized and high responsiveness can be achieved.

According to the invention set forth in claim 2, the rotation of the cage rings that restrict the circumferential positions of respective cams coordinates the tilting motions of the first cams and second cams with each other, to avoid structural complexity of the cam clutch and an increase in the number of components. Providing an inner race cage ring and an outer race cage ring enables easy coordination of the tilting motions of the cams and facilitates changes of cam postures.

According to the invention set forth in claim 3, the operation modes can be switched over only by moving at least one of the cage rings axially to tilt the cams. This obviates the need for synchronizing a mechanism for changing the cam postures with the rotation of the outer race or inner race that is used as the input-side rotating body so that no intricate operation is required, and helps prevent an increase in size or number of components of the cam clutch. In switching the operation mode from a lock mode to a free mode, no large force is required to change the cam postures. Therefore the engaging surfaces of the cams, the raceway of the inner race, and the raceway of the outer race are less prone to damage, and the service life can be prolonged. Using cage rings, which can have a relatively high rigidity, to change the cam postures, can reduce the risk of breakage in the switching of operation modes, and offers robustness.

According to the invention set forth in claim 4, the cage rings serving as the cam interlock mechanism are integral with the mechanism for changing the cam postures, so that a size reduction can be achieved and the number of components can be reduced, as well as the holding torque can be increased. The openings of the cage ring serving as the cam accommodating parts are odd-shaped, suitably designed for controlling the postures of the cams, rather than simple rectangles. Thus the cams that can get slightly stuck due to production errors or the like can be disengaged with a small thrust. Moreover, additional operation modes and switching between these operation modes can be realized by suitably changing the opening shapes of the cam accommodating parts of the cage ring.

According to the invention set forth in claim 5, when the operation mode of the cam clutch is switched to the free mode, the corresponding cam accommodating parts of the inner race cage ring and outer race cage ring are circumferentially positioned such as to keep the cam engaging surfaces separated from the raceway of the inner race and/or the raceway of the outer race, so that accidental wedging of the cams can be prevented.

According to the invention set forth in claim 6, the cams that may get accidentally and slightly stuck due to production errors or the like can be easily freed.

According to the invention set forth in claim 7, a highly reliable coordination is possible because a change in the cam posture does not cause a change in the gaps between the cams and the cam accommodating parts of the cage ring.

BRIEF DESCRIPTION OF THE DRAWINGS

FIG. 13B is a partial radial cross-sectional view of the cam clutch cut across a plane perpendicular to the rotation axis, showing the cams when the cam clutch operation mode is the free mode;

DESCRIPTION OF THE PREFERRED EMBODIMENTS

Figure 1:
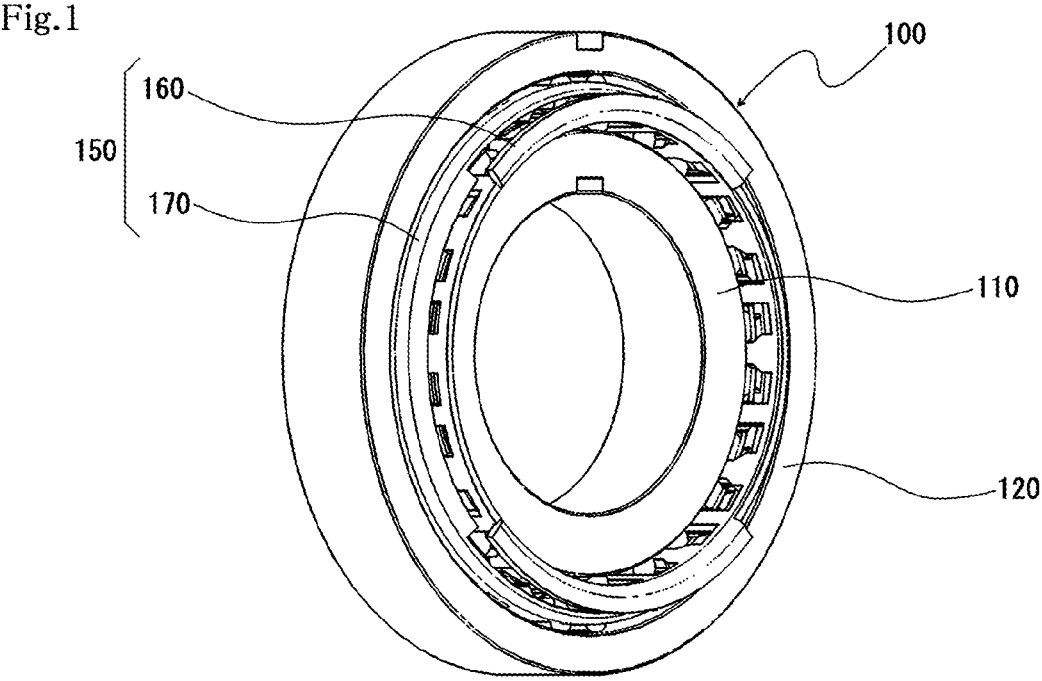
FIG. 1 is a perspective view illustrating a configuration example of a cam clutch according to the present invention.
Figure 2:
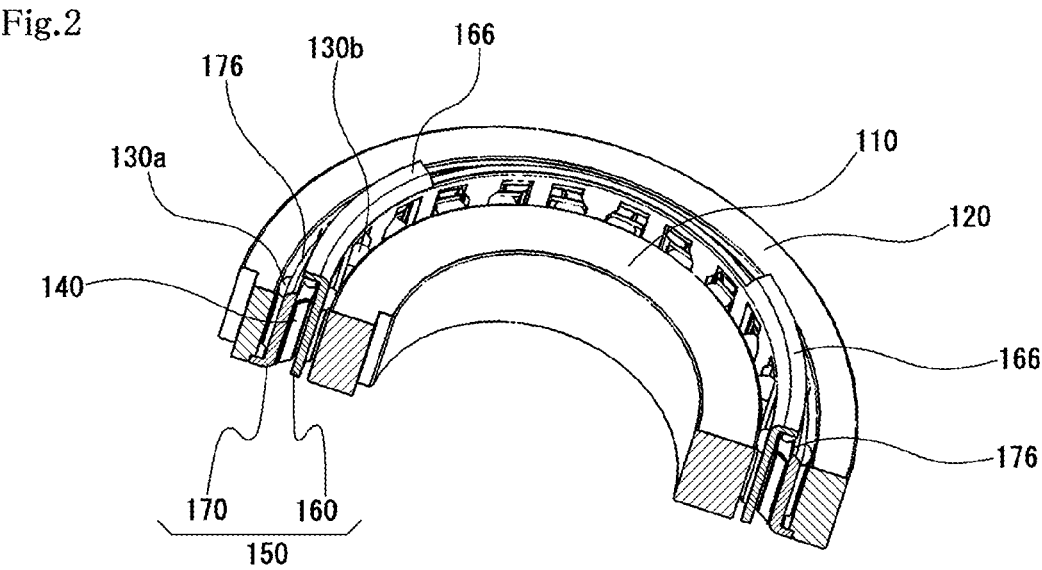
FIG. 2 is a perspective view of the cam clutch shown in FIG. 1 with a cross section along a plane containing the rotation axis of the cam clutch.
Figure 3:
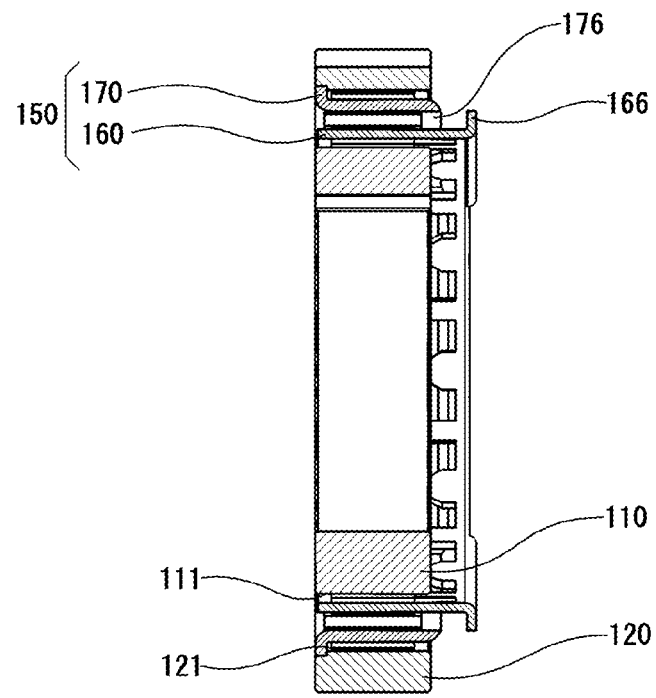
FIG. 3 is an axial cross-sectional view of the cam clutch shown in FIG. 1 cut across a plane containing the rotation axis of the cam clutch.

Embodiments of the present invention are described with reference to FIG. 1 to FIG. 15C.

As shown in FIG. 1 to FIG. 4, the cam clutch 100 according to the present invention includes: an inner race 110 and an outer race 120 coaxial and rotatable relative to each other; a plurality of circumferentially spaced cams in an annular space between raceways 111 and 121 of the inner race 110 and outer race 120 serving as sprags to transmit and interrupt torque between the inner race 110 and outer race 120; a biasing means 140 biasing each of the plurality of cams toward an engaging direction to make contact with the inner race 110 and outer race 120; and a cam interlock mechanism 150 that tilts each of the plurality of cams in a coordinated manner.

The plurality of cams include first cams 130a and second cams 130b that wedge against the inner race 110 and outer race 120 in different directions. In this embodiment, the first cams 130a and second cams 130b have outer shapes that are identical to each other, for example, the first cams 130a reversed front to back being used as the second cams 130b.

The first cams 130a and second cams 130b are circumferentially alternately arranged on the same circle so that the cam clutch 100 can operate in a two-way lock mode in which relative rotation of the inner race 110 and outer race 120 is prohibited in both directions.

The first cams 130a are circumferentially equally spaced. The second cams 130b are circumferentially equally spaced, and each displaced from the center position between two adjacent first cams 130a toward the disengaging direction of the first cams 130a. This cam arrangement can reduce structural limitations regarding posture changes (rotating amount) of the cams when switching the operation mode of the cam clutch 100 to a two-way free mode, as compared to the arrangement in which all the cams are equally spaced.

The cam arrangement is not limited to this particular layout. The first cams 130a and second cams 130b may be circumferentially equally spaced.

Figure 4:
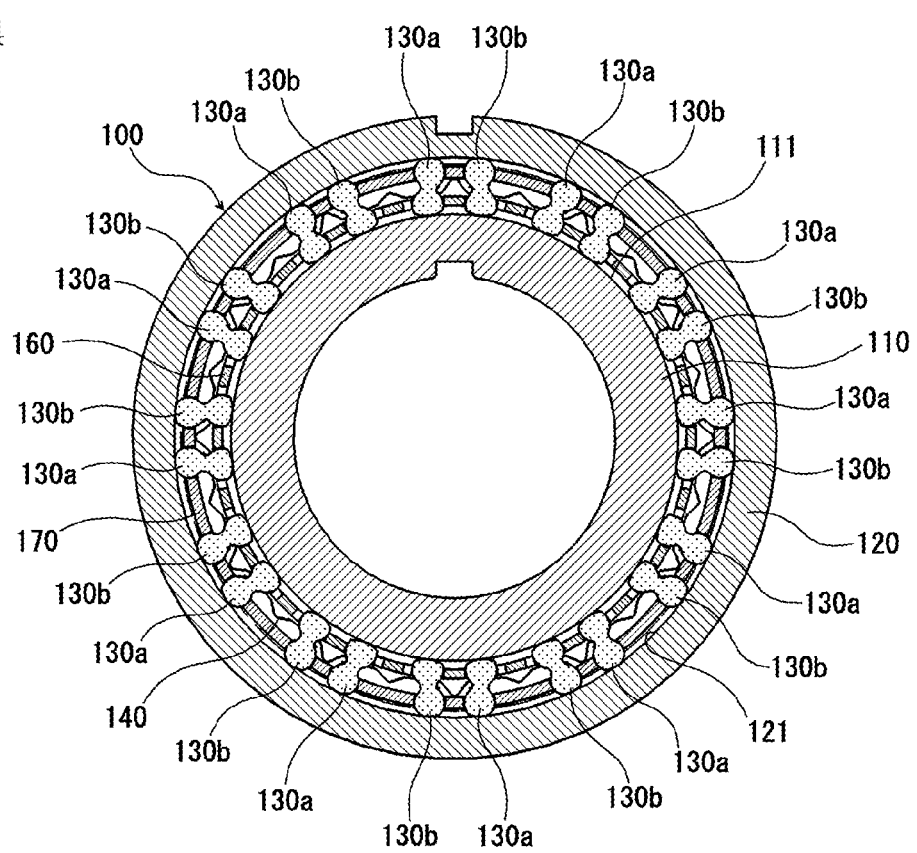
FIG. 4 is a radial cross-sectional view of the cam clutch shown in FIG. 1 cut across a plane perpendicular to the rotation axis of the cam clutch.

The engaging direction of the first cams 130a is counterclockwise in FIG. 4. The first cams 130a are configured to wedge against the inner race 110 and outer race 120 when the inner race 110 is rotated in the forward direction (clockwise), or when the outer race 120 is rotated in the reverse direction (counterclockwise).

The engaging direction of the second cams 130b is clockwise in FIG. 4. The second cams 130b are configured to wedge against the inner race 110 and outer race 120 when the inner race 110 is rotated in the reverse direction (counterclockwise), or when the outer race 120 is rotated in the forward direction (clockwise).

The biasing means 140 is a ribbon spring, for example. The biasing means 140 may be any resilient member that can bias each of the first cams 130a and second cams 130b in the engaging direction. For example, a plurality of plate springs or torsion springs may also be used.

Figure 5:
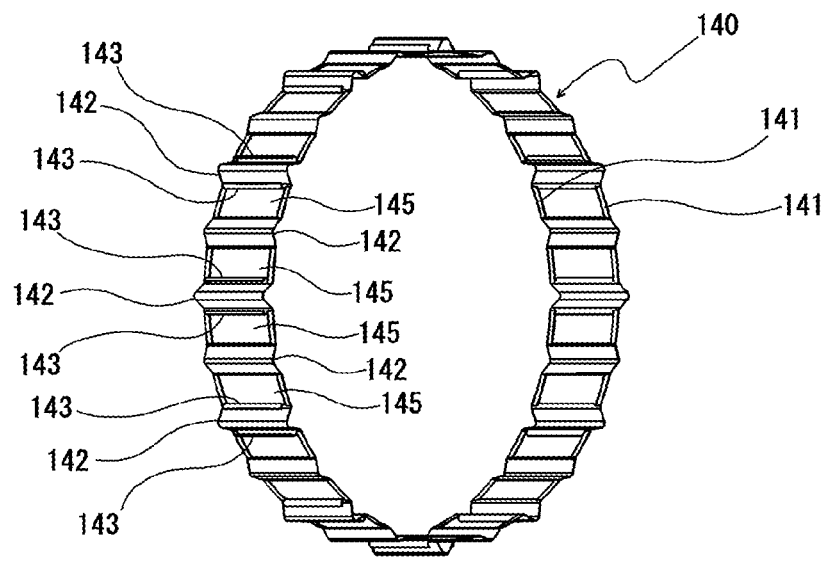
FIG. 5 is a perspective view illustrating a configuration of a biasing means in the cam clutch shown in FIG. 1.

The ribbon spring as the biasing means 140 is made up for example of a pair of circumferentially extending annular parts 141 parallel to each other, and a plurality of connecting parts 142 connecting the annular parts 141 in the axial direction at a predetermined distance as shown in FIG. 5, the space between adjacent connecting parts 142 each being a cam accommodating part 145. The cam accommodating parts 145 are circumferentially equally spaced apart.

The connecting parts 142 are plate spring portions protruding radially outward such as to have a V-shaped cross section. Every other connecting part 142 is provided with an arcuately curved pressing portion 143 along both edges, these pressing portions 143 biasing each of the first cams 130a and second cams 130b in the directions in which they wedge against the inner race 110 and outer race 120.

The cam interlock mechanism 150 includes a cylindrical inner race cage ring 160 and a cylindrical outer race cage ring 170 coaxially provided between the inner race 110 and the outer race 120 such as to be rotatable either with the inner race 110 or the outer race 120. The inner race cage ring 160 and outer race cage ring 170 are configured to rotate when the first cams 130a tilt toward the engaging direction, which causes the second cams 130b to tilt in the disengaging direction and separates the engaging surfaces of the second cams 130b from the raceway 111 of the inner race 110 and/or the raceway 121 of the outer race 120.

The rotation of the cage rings that restrict the circumferential positions of respective cams is coordinated with the tilting motions of the first cams 130a and second cams 130b, to avoid structural complexity of the cam clutch 100 and an increase in the number of components. Providing the inner race cage ring 160 and outer race cage ring 170 enables easy coordination of the tilting motions of the cams and facilitates changes of cam postures.

The inner race cage ring 160 is movable in the axial direction independently of the rotation of the inner race 110 and outer race 120. This way, the cam clutch 100 is configured to be switchable by an axial movement of the inner race cage ring 160 between the two-way lock mode that prohibits relative rotation of the inner race 110 and outer race 120 in both directions and the two-way free mode that allows relative rotation of the inner race 110 and outer race 120 in both directions. This obviates the need for synchronizing a mechanism for changing the cam postures with the rotation of the inner race 110 or outer race 120 that is used as the input-side rotating body so that no intricate operation is required, and helps prevent an increase in size or number of components of the cam clutch 100. The cam clutch 100 does not require a large force to change the cam postures when switching its operation mode from the two-way lock mode to the free mode. Therefore the engaging surfaces of the cams, the raceway 111 of the inner race 110, and the raceway 121 of the outer race 120 are less prone to damage, and the service life can be prolonged. Using cage rings, which can have a relatively high rigidity, to change the cam postures, can reduce the risk of breakage in the switching of operation modes, and offers robustness.

Figure 6A:
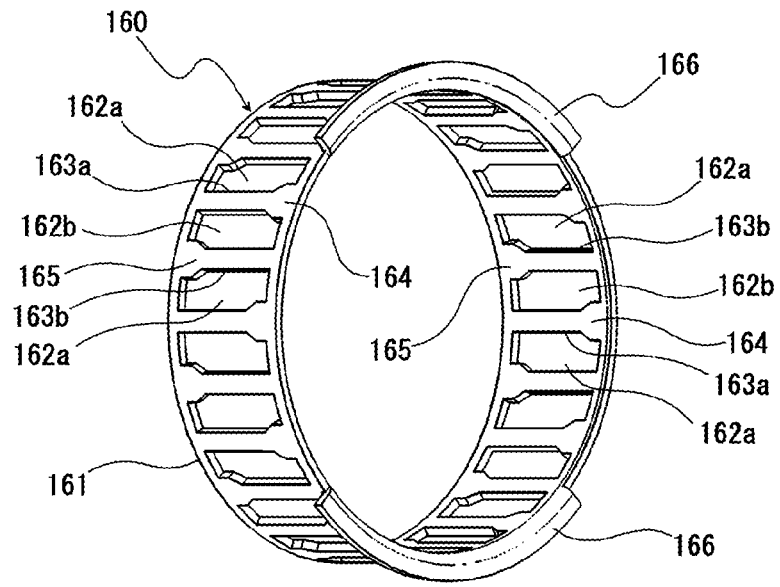
FIG. 6A is a perspective view illustrating a configuration of an inner race cage ring.
Figure 6B:
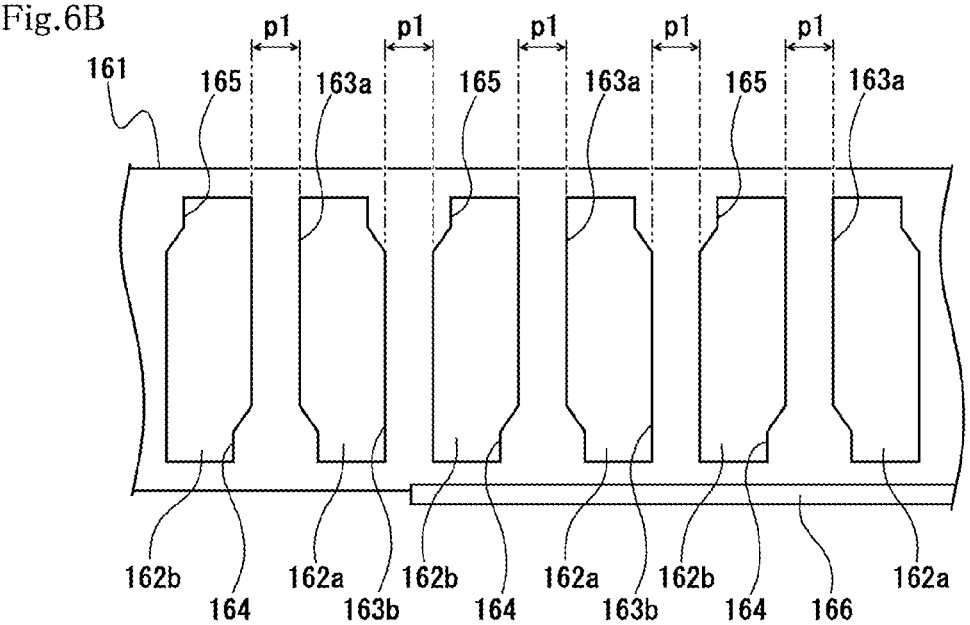
FIG. 6B is a partially developed view of the inner race cage ring shown in FIG. 6A.

The inner race cage ring 160 includes an axially extending cylindrical body part 161 and flange parts 166 extending radially outward from one end on the rear side in the cage ring moving direction (axial direction) of the body part 161 as shown in FIG. 6A and FIG. 6B. The flange parts 166 extend in the circumferential direction at two circumferential locations opposite each other across the rotation axis.

The body part 161 has a plurality of cam accommodating parts circumferentially spaced at an equal distance p1, for example. While the cam accommodating parts are circumferentially equally spaced in this embodiment, they may be arranged in a regular pattern or randomly.

Axially extending brace parts 163a separate first cam accommodating parts 162a that accommodate the first cams 130a from second cam accommodating parts 162b that accommodate the second cams 130b adjacent in the disengaging direction of the first cams 130a. The brace parts 163a have a tapering cam posture change part 164 at one end on the rear side in the moving direction of the cage ring, to increase in width toward the rear side.

The cam clutch 100 of this embodiment is configured to include cam attitude change parts 164, which are a mechanism for changing the cam postures, integral with the inner race cage ring 160 that is part of the cam interlock mechanism 150, to reduce the size and number of components, and to increase the holding torque.

Axially extending brace parts 163b separate first cam accommodating parts 162a that accommodate the first cams 130a from second cam accommodating parts 162b that accommodate the second cams 130b adjacent in the engaging direction of the first cams 130a. The brace parts 163b have a tapering position restricting part 165 at one end on the front side in the moving direction of the cage ring, to increase in width toward the front side. The position restricting parts 165 have the same shape as the cam posture change parts 164.

As described above, the first cam accommodating parts 162a and second cam accommodating parts 162b are not simple rectangular windows but are odd-shaped windows that reduce in opening width at both axial ends. Thus the cams that can get slightly stuck due to production errors or the like can be disengaged with a small thrust. Moreover, additional operation modes and switching between these operation modes can be realized by suitably changing the opening shapes of the first cam accommodating parts 162a and second cam accommodating parts 162b.

Figure 7A:
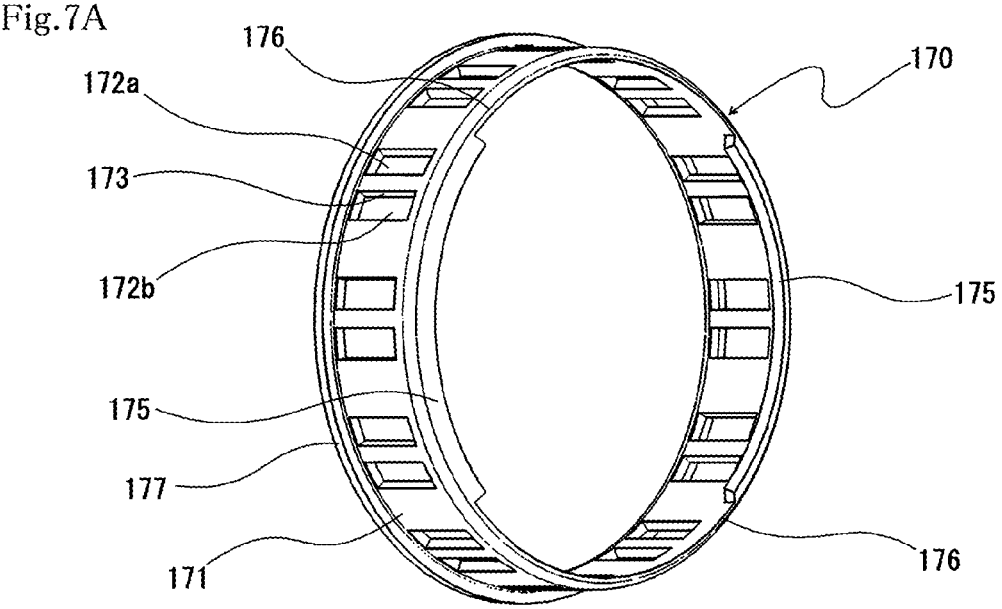
FIG. 7A is a perspective view illustrating a configuration of an outer race cage ring.
Figure 7B:
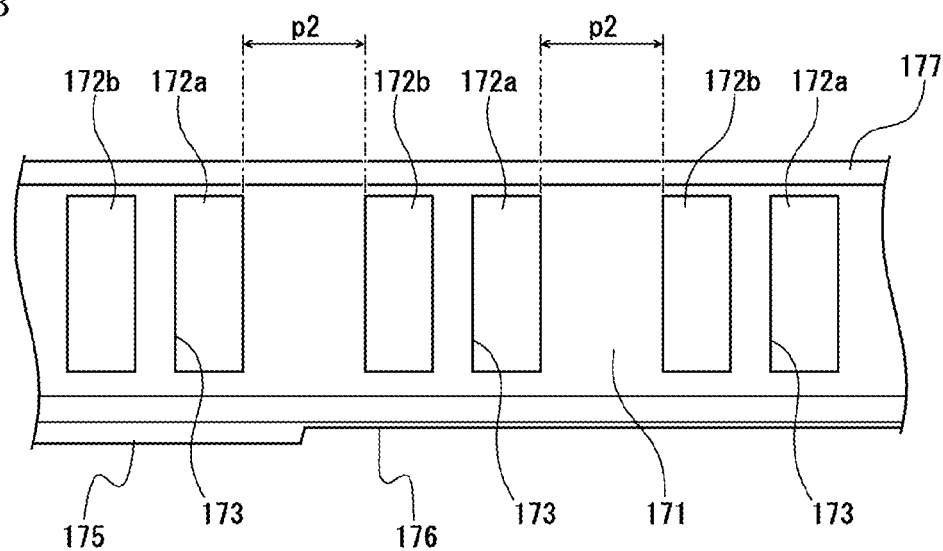
FIG. 7B is a partially developed view of the outer race cage ring shown in FIG. 7A.

The outer race cage ring 170 includes an axially extending cylindrical body part 171, and an annular flange part 175 provided at one axial end of the body part 171 to serve as a portion that prevents unwanted wedging as shown in FIG. 7A and FIG. 7B. Reference numeral 177 in FIG. 7A and FIG. 7B denotes a fitting part fitted to the outer race 120 from inside.

The body part 171 has a plurality of rectangular windows circumferentially spaced at an equal distance p2, for example. While the windows are circumferentially equally spaced in this embodiment, they may be arranged in a regular pattern or randomly.

Each window is divided by an axially extending brace part 173 into two cam accommodating parts, one being a first cam accommodating part 172a that accommodates a first cam 130a and the other being a second cam accommodating part 172b that accommodates a second cams 130b. The first cam accommodating parts 172a and second cam accommodating parts 172b are rectangular windows with a uniform opening width along the axial direction.

The flange part 175 is arcuately curved radially inward so as to reduce in diameter outward in the axial direction.

Figure 8:
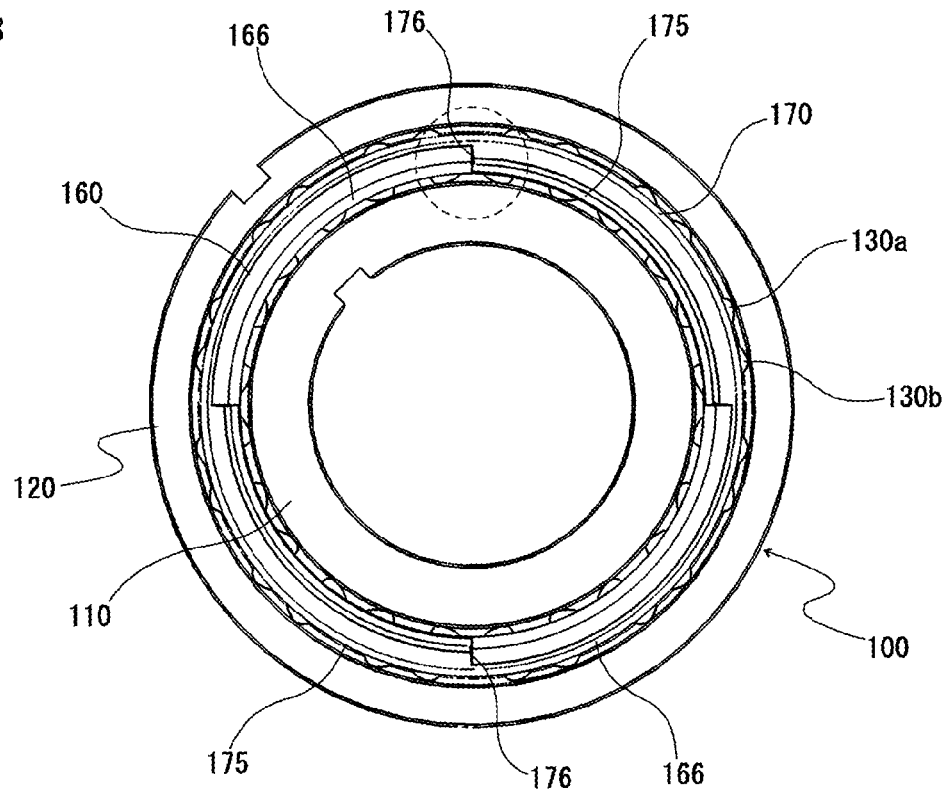
FIG. 8 is a rear view of the cam clutch shown in FIG. 1 in a state in which the operation mode has been switched from a two-way lock mode to a two-way free mode, viewed from the back side in the moving direction of the cage ring.
Figure 9:
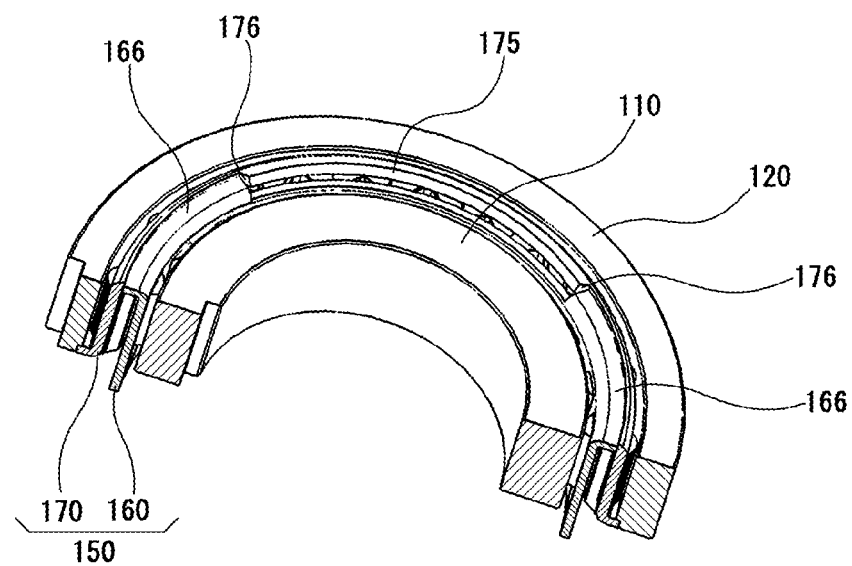
FIG. 9 is a perspective view of the cam clutch in the state shown in FIG. 8 with a cross section along a plane containing the rotation axis of the cam clutch.
Figure 10:
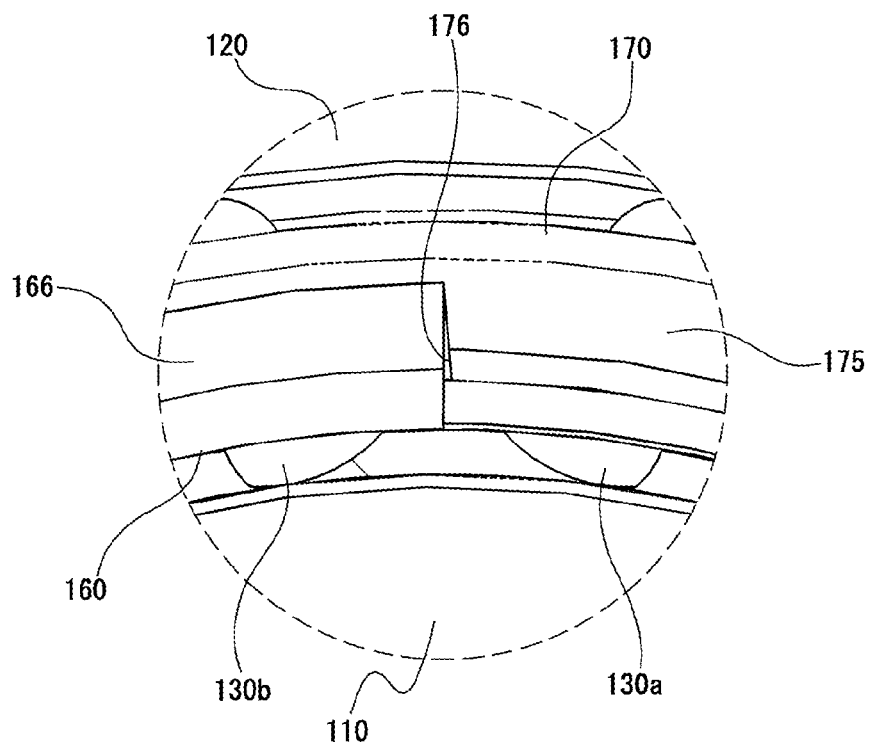
FIG. 10 is an enlarged view of the part encircled with a broken line in FIG. 8.

The flange part 175 is formed with mating parts 176 configured to be complementary to the flange parts 166 of the inner race cage ring 160 when the inner race cage ring 160 is moved to a position where the operation mode of the cam clutch 100 is set to the two-way free mode, as shown also in FIG. 8 to FIG. 10.

The circumferentially facing inner side faces of the mating parts 176 are tapered so that the distance therebetween increases toward the rear side in the moving direction of the cage ring as shown in FIG. 10. This makes it possible for the corresponding cam accommodating parts of the inner race cage ring 160 and outer race cage ring 170 to be circumferentially positioned such as to keep the cam engaging surfaces separated from the raceway 111 of the inner race 110 and/or the raceway 121 of the outer race 120 when the operation mode of the cam clutch 100 is switched to the free mode. Thus accidental unwanted wedging of the cams is prevented, and also, the clearance in the mating parts can be used to adjust the degree by which the cam accommodating parts of the inner race cage ring 160 and the corresponding cam accommodating parts of the outer race cage ring 170 can be out of phase in their circumferential positions.

Figure 11:
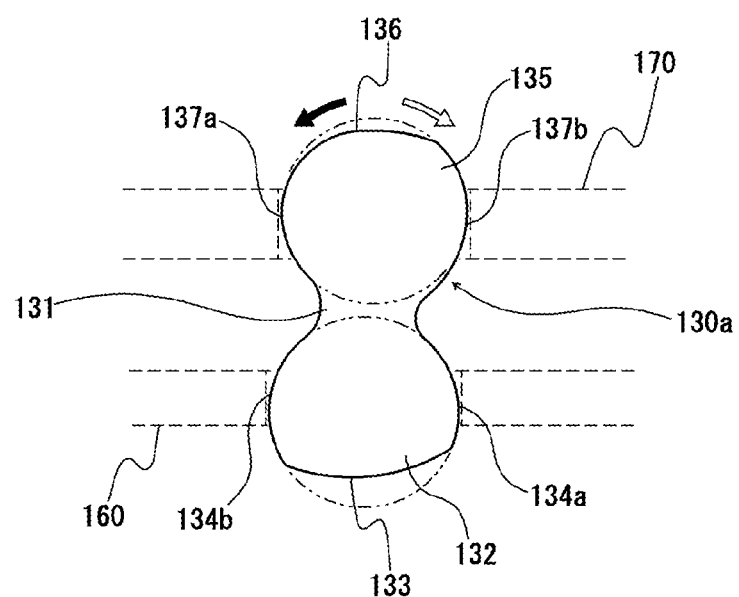
FIG. 11 is a plan view illustrating the structure of the cam.

The first cams 130a in this embodiment have a substantially figure-eight shape in plan view, as shown in FIG. 11, with a constricted part 131 in the middle in the radial direction. In FIG. 11, the solid arrow indicates the engaging direction of the first cam 130a and the open arrow indicates the disengaging direction of the first cam 130a.

A leg part 132 on the radially inner side of the constricted part 131 has an arcuate inner race engaging surface 133. Side faces 134a and 134b smoothly continuous with the inner race engaging surface 133 and in contact with the inner race cage ring 160 are both formed as curved surfaces along circular arcs having the same center. A head part 135 on the radially outer side of the constricted part 131 has an arcuate outer race engaging surface 136. Side faces 137a and 137b smoothly continuous with the outer race engaging surface 136 and in contact with the outer race cage ring 170 are both formed as curved surfaces along circular arcs having the same center. This ensures that the gap between the first cam accommodating parts 162a of the inner race cage ring 160 and the first cams 130a and the gap between the first cam accommodating parts 172a of the outer race cage ring 170 and the first cams 130a do not change as the first cams 130a change their posture, which enables highly coordinated motion. While the leg part 132 of the cam shown in FIG. 11 has side faces 134a and 134b formed as curved surfaces along the same circular arc, the side faces 134a and 134b may be formed along concentric circular arcs. The same applies to the side faces 137a and 137b of the head part 135.

As mentioned above, the second cams 130b are the first cams 130a reversed front to back, i.e., the second cams 130b have the same shape as the first cams 130a.

Hereinafter, the operation of the cam clutch 100 according to this embodiment will be described with reference to FIG. 12A and FIG. 12B.

Figure 12A:
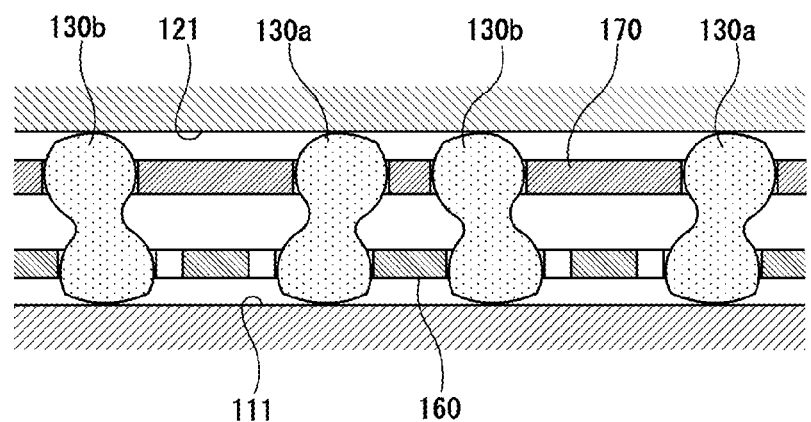
FIG. 12A and FIG. 12B are schematic diagrams for explaining coordinated movements of the cams.

When the cam clutch 100 is retained in the two-way lock mode in which relative rotation of the inner race 110 and outer race 120 is prohibited in both directions, the first cams 130a and second cams 130b are both kept standby as shown in FIG. 12A so that they can start wedging against the inner race 110 and outer race 120 immediately upon torque input to the inner race 110 or the outer race 120. For convenience of explanation, FIG. 12A illustrates the raceway 111 of the inner race 110 and the raceway 121 of the outer race 120 as parallel flat surfaces.

Figure 12B:
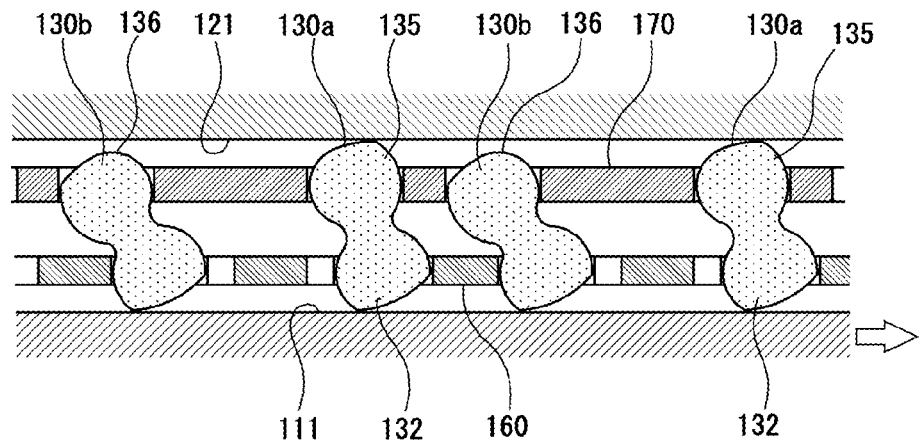

When the inner race 110 is rotated in the forward direction (indicated with the open arrow), for example, the first cams 130a rotate or tilt in the engaging direction as shown in FIG. 12B. As the first cams 130a tilt, the inner race cage ring 160 is pushed by the leg parts 132 of the first cams 130a and rotates in the forward direction, and the outer race cage ring 170 is pushed by the head parts 135 of the first cams 130a and rotates in the reverse direction. The rotation of the inner race cage ring 160 and outer race cage ring 170 causes the second cams 130b to rotate or tilt in the disengaging direction so that the outer race engaging surfaces 136 of the second cams 130b separate from the raceway 121 of the outer race 120.

When the torque is removed from the inner race 110, the first cams 130a rotate or tilt in the disengaging direction to the standby position. At this time, the second cams 130b also rotate or tilt in the engaging direction. However, since the outer race engaging surfaces 136 of the second cams 130b have been separated from the raceway 121 of the outer race 120 by the time the first cams 130a engage, the second cams 130b do not start wedging against the inner race 110 and outer race 120 before the first cams 130a are disengaged. Thus all of the first cams 130a and second cams 130b can be brought back to standby in a reliable manner.

When the inner race 110 is rotated in the reverse direction, the second cams 130b rotate or tilt in the engaging direction, and as the second cams 130b tilt, the inner race cage ring 160 and outer race cage ring 170 rotate therewith. The rotation of the inner race cage ring 160 and outer race cage ring 170 causes the first cams 130a to rotate or tilt in the disengaging direction so that the outer race engaging surfaces 136 of the first cams 130a separate from the raceway 121 of the outer race 120.

When the torque is removed from the inner race 110, the second cams 130b rotate or tilt in the disengaging direction. The first cams 130a do not start wedging against the inner race 110 and outer race 120 before the second cams 130b are disengaged. Thus all of the first cams 130a and second cams 130b can be brought back to standby in a reliable manner.

The rotating movements of the first cams 130a and second cams 130b are coordinated with each other by the cam interlock mechanism 150 in this way, to achieve smooth operation without unwanted wedging.

Next, the switching of the operation modes of the cam clutch 100 will be described.

Figure 13A:
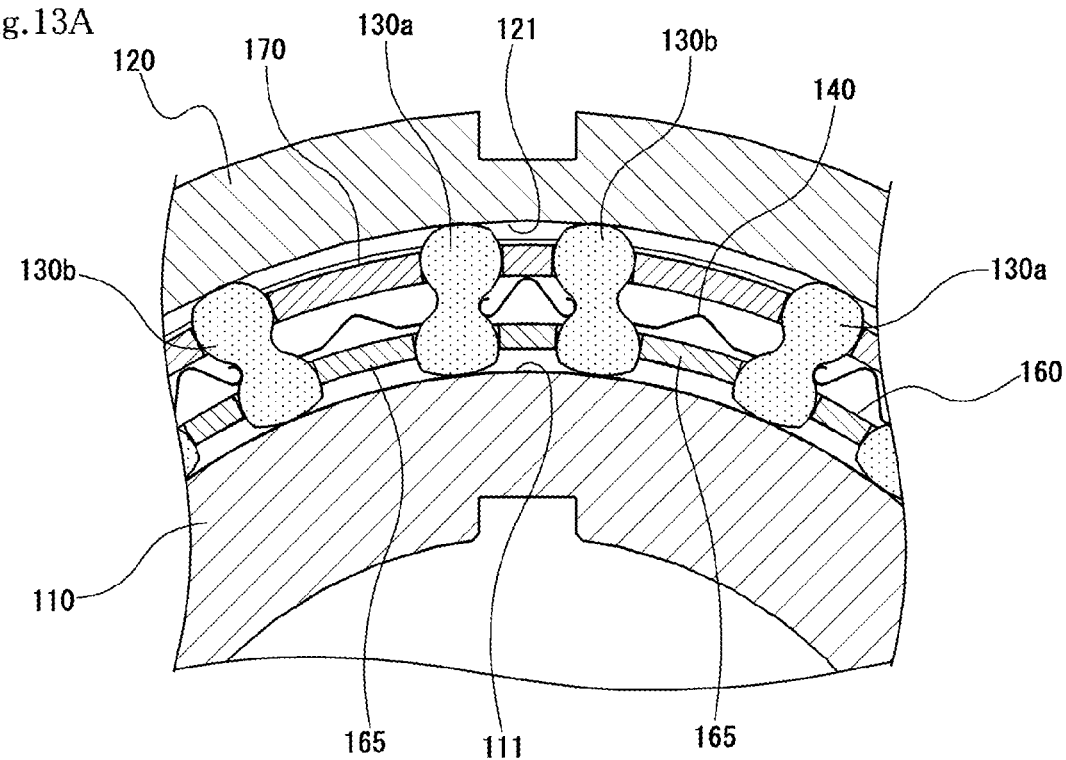
FIG. 13A is a partial radial cross-sectional view of the cam clutch cut across a plane perpendicular to the rotation axis, showing the cams when the cam clutch operation mode is the two-way lock mode.

When the cam clutch 100 is retained in the two-way lock mode in which relative rotation of the inner race 110 and outer race 120 is prohibited in both directions, the position restricting parts 165 of the inner race cage ring 160 are located between the first cams 130a and the second cams 130b adjacent the first cams 130a in the engaging direction as shown in FIG. 13A, where the respective cam accommodating parts of the inner race cage ring 160 and outer race cage ring 170 are circumferentially positioned such as to keep the first cams 130a and second cams 130b standby.

Moving the inner race cage ring 160 axially causes the cam posture change parts 164 of the inner race cage ring 160 to be positioned between the first cams 130a and the second cams 130b adjacent in the disengaging direction of the first cams 130a as shown in FIG. 13B, as well as causes the flange parts 166 of the inner race cage ring 160 to fit with the mating parts 176 of the outer race cage ring 170. At this time, the taper of the cam posture change parts 164 causes the first cams 130a and second cams 130b to rotate and tilt in their disengaging directions, so that the outer race engaging surfaces 136 of the first cams 130a and the outer race engaging surfaces 136 of the second cams 130b separate from the raceway 121 of the outer race 120.

In this state, the respective cam accommodating parts of the inner race cage ring 160 and outer race cage ring 170 are circumferentially positioned such as to keep the outer race engaging surfaces 136 of the first cams 130a and the outer race engaging surfaces 136 of the second cams 130b separated from the raceway 121 of the outer race 120, so that the first cams 130a and second cams 130b are restricted from rotating and tilting in the engaging direction.

The operation mode of the cam clutch 100 is switched from the two-way lock mode to the free mode by axially moving the inner race cage ring 160 in this way.

While the cam clutch described in the above embodiment is configured to be switchable between the two-way lock mode and the free mode, the cam clutch can be configured to be operable in 3 modes including a one-way lock mode by suitably changing the opening shape of the cam accommodating parts of the inner race cage ring. The cam clutch can also be configured to be operable in 4 modes by an odd-shaped design for the openings of the cam accommodating parts of the outer race cage ring as well as by suitably changing how the cage rings are moved.

For example, the following will illustrate a cam interlock mechanism composed of two cage rings for allowing the cam clutch to operate in 3 modes including a one-way lock mode.

Figure 14:
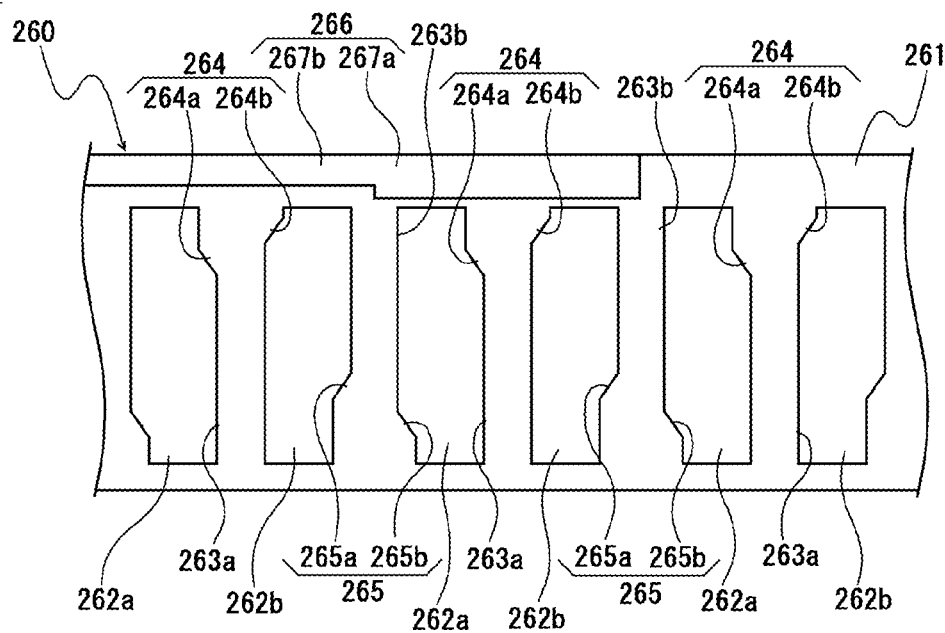
FIG. 14 is a partially developed view of a schematic configuration of an inner race cage ring that is a part of a cam interlock mechanism for allowing the cam clutch to operate in 3 modes.

As shown in the schematic view of FIG. 14, the inner race cage ring 260 includes a cylindrical body part 261 having a plurality of circumferentially arranged, regularly patterned cam accommodating parts, and flange parts 266 extending radially outward from one end on the rear side in the cage ring moving direction (axial direction) of the body part 261. The flange parts 266 extend in the circumferential direction at two circumferential locations opposite each other across the rotation axis.

The flange parts 266 are formed in two steps and include a first step 267a having a circumferentially uniform axial size, and a second step 267b having a circumferentially uniform and smaller axial size than the first step 267a.

Axially extending brace parts 263a separate first cam accommodating parts 262a that accommodate the first cams 130a from second cam accommodating parts 262b that accommodate the second cams 130b adjacent in the disengaging direction of the first cams 130a. The brace parts 263a have a cam posture change part 264 at the rear end in the moving direction of the cage ring. The cam posture change parts 264 are vertically asymmetric with respect to the center of the brace parts 263a.

The cam posture change part 264 includes a first tapered portion 264a and a second tapered portion 264b.

The first tapered portion 264a is linear and continuous with the side edge of the brace part 263a on one side relative to the center of the brace part 263a facing the second cam accommodating part 262b, and tapered on the other side facing the first cam accommodating part 262a to increase in width toward the rear in the moving direction of the cage ring.

The second tapered portion 264b is linear and continuous with the taper of the first tapered portion 264a on one side relative to the center of the brace part 263a facing the first cam accommodating part 262a, and tapered on the other side facing the second cam accommodating part 262b to increase in width toward the rear in the moving direction of the cage ring.

Axially extending brace parts 263b separate first cam accommodating parts 262a that accommodate the first cams 130a from second cam accommodating parts 262b that accommodate the second cams 130b adjacent in the engaging direction of the first cams 130a. The brace parts 263b have a position restricting part 265 at the front end in the moving direction of the cage ring. The position restricting parts 265 have substantially the same shape as the cam posture change parts 264 and include a first tapered portion 265a and a second tapered portion 265b. The position restricting parts 265 are formed such that the taper of the first tapered portion 265a is positioned on the side facing the second cam accommodating part 262b, and the taper of the second tapered portion 265b is positioned on the other side facing the first cam accommodating part 262a.

As described above, the first cam accommodating parts 262a and second cam accommodating parts 262b are not simple rectangular windows but are odd-shaped windows that reduce in opening width at both axial ends.

Figure 15A:
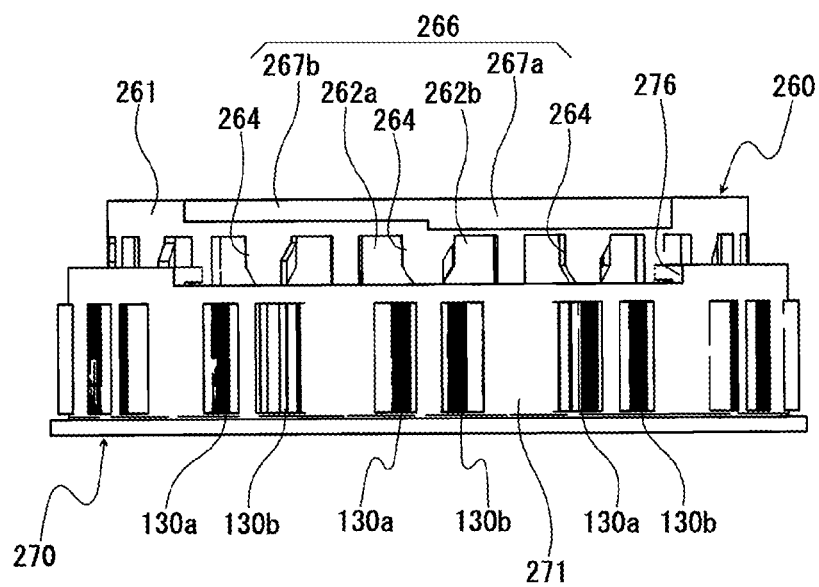
FIG. 15A is a plan view of a cam clutch illustrating another configuration example of a cam interlock mechanism in a state in which the operation mode is a two-way lock mode.

The outer race cage ring 270 is similarly configured as the one shown in FIG. 7A and FIG. 7B except that one axial end edge of the body part 271 is cut off to form a mating part 276 configured to be complementary to the flange part 266 of the inner race cage ring 260 as shown in FIG. 15A.

This cam interlock mechanism is configured such that, when the cam clutch 100 is retained in the two-way lock mode in which relative rotation of the inner race 110 and outer race 120 is prohibited in both directions, the position restricting parts 265 of the inner race cage ring 260 are located between the first cams 130a and the second cams 130b adjacent the first cams 130a in the engaging direction as shown in FIG. 15A, where the respective cam accommodating parts of the inner race cage ring 260 and outer race cage ring 270 are circumferentially positioned such as to keep the first cams 130a and second cams 130b standby.

Figure 15B:
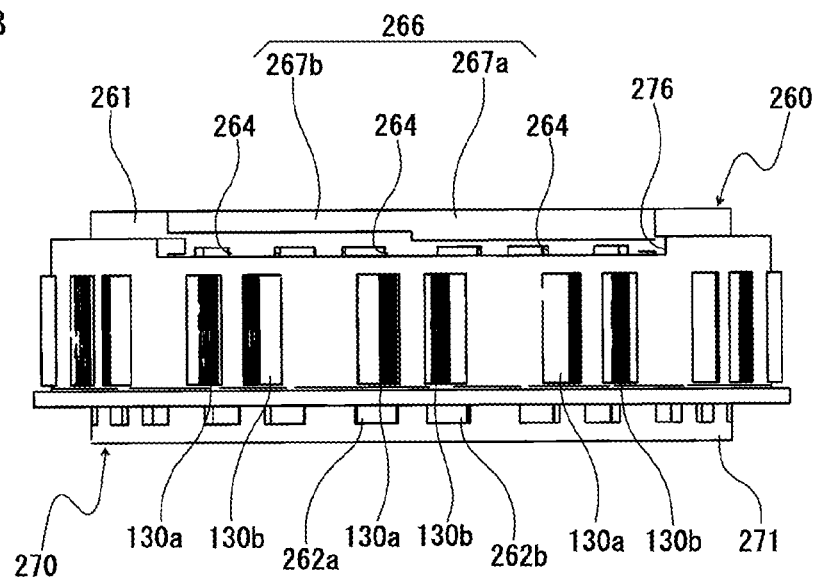
FIG. 15B is a plan view illustrating the state of the cam interlock mechanism of the cam clutch when the operation mode is a one-way lock mode.

As shown in FIG. 15B, when the inner race cage ring 260 is moved axially forward and the first step 267a of the flange part 266 of the inner race cage ring 260 fits with the mating part 276 of the outer race cage ring 270, the first tapered portions 264a of the cam posture change parts 264 of the inner race cage ring 260 are positioned between the first cams 130a and the second cams 130b adjacent in the disengaging direction of the first cams 130a. At this time, the taper of the first tapered portions 264a of the cam posture change parts 264 causes the first cams 130a to rotate and tilt in the disengaging direction, so that the outer race engaging surfaces 136 of the first cams 130a separate from the raceway 121 of the outer race 120. The second cams 130b are kept standby.

In this state, the respective cam accommodating parts of the inner race cage ring 260 and outer race cage ring 270 are circumferentially positioned such as to keep the outer race engaging surfaces 136 of the first cams 130a separated from the raceway 121 of the outer race 120, so that the first cams 130a are restricted from rotating and tilting in the engaging direction, and thus the operation mode of the cam clutch is switched to the one-way lock mode.

Figure 15C:
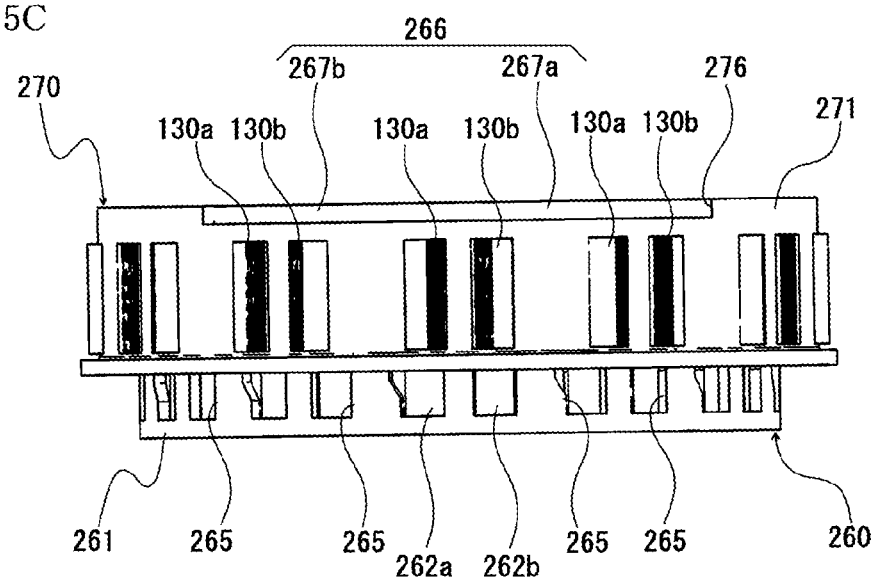
FIG. 15C is a plan view illustrating the state of the cam interlock mechanism of the cam clutch when the operation mode is a two-way free mode.

As shown in FIG. 15C, when the inner race cage ring 260 is moved further axially forward and the second step 267b of the flange part 266 of the inner race cage ring 260 fits with the mating part 276 of the outer race cage ring 270, the second tapered portions 264b of the cam posture change parts 264 of the inner race cage ring 260 are positioned between the first cams 130a and the second cams 130b adjacent in the disengaging direction of the first cams 130*a*. At this time, the taper of the second tapered portions 264*b* of the cam posture change parts 264 causes the second cams 130*b* to rotate and tilt in the disengaging direction, so that the outer race engaging surfaces 136 of the second cams 130*b* separate from the raceway 121 of the outer race 120. The outer race engaging surfaces 136 of the first cams 130*a* are kept separated from the raceway 121 of the outer race 120.

In this state, the respective cam accommodating parts of the inner race cage ring 260 and outer race cage ring 270 are circumferentially positioned such as to keep the outer race engaging surfaces 136 of the first cams 130*a* and the outer race engaging surfaces 136 of the second cams 130*b* separated from the raceway 121 of the outer race 120. Therefore, the first cams 130*a* and second cams 130*b* are stopped from rotating and tilting in the engaging direction, and thus the operation mode of the cam clutch is switched to the two-way free mode.

The shape of the openings of the cam accommodating parts can be changed suitably as described above to make the cam clutch switchable between three operation modes by a stepwise axial movement of the inner race cage ring 260.

While embodiments of the present invention have been described in detail, the present invention is not limited to the above-described embodiments and may be carried out with various design changes without departing from the scope of the present invention set forth in the claims.

While the cam interlock mechanism is configured with cage rings in the embodiment described above, the cam interlock mechanism may employ other configurations that coordinate the tilting motions of the first cams and second cams. In the case of using cage rings, the cam interlock mechanism may not necessarily be configured with two, inner race and outer race, cage rings, and can be formed by one cage ring.

While the inner race cage ring is axially moved to switch between operation modes in the configuration described in the above embodiment, other configurations are also possible wherein the outer race cage ring is axially moved, or the inner race cage ring and outer race cage ring are both moved axially, to switch from one operation mode to another.

While the cams are lifted off from the outer race in the free mode in the configuration described in the above embodiment, the cam clutch of the present invention may be configured to lift off the cams from the inner race.

What is claimed is:

1. A cam clutch comprising:
    an inner race and an outer race that are coaxial and rotatable relative to each other;
    a plurality of cams circumferentially arranged at intervals between the inner race and the outer race; and
    a biasing means biasing each of the plurality of cams to make contact with the inner race and the outer race,
    the plurality of cams including first cams and second cams that wedge against the inner race and the outer race in different directions from each other,
    the cam clutch further comprising a cam interlock mechanism that tilts each of the plurality of cams in a coordinated manner,
    the cam interlock mechanism being configured to tilt the second cams in a disengaging direction with a tilting motion of the first cams in an engaging direction to separate an engaging surface of the second cams from a raceway of the inner race and/or a raceway of the outer race.

2. The cam clutch according to claim 1, wherein the cam interlock mechanism includes a cylindrical inner race cage ring and a cylindrical outer race cage ring coaxially provided between the inner race and the outer race such as to be rotatable either with the inner race or the outer race,
    the cam interlock mechanism being configured to tilt the second cams in a disengaging direction by rotation of the inner race cage ring and the outer race cage ring with a tilting motion of the first cams in an engaging direction.

3. The cam clutch according to claim 2, wherein at least one or both of the inner race cage ring and the outer race cage ring is/are axially movable independently of rotation of the inner race and the outer race,
    the cam clutch being configured to be switchable between a free mode that allows relative rotation of the outer race and the inner race in both directions and a lock mode that prohibits relative rotation of the outer race and the inner race in one or both of forward and reverse directions by an axial movement of at least one or both of the inner race cage ring and the outer race cage ring.

4. The cam clutch according to claim 3, wherein the first cams and the second cams are arranged on a same circle,
    one of the inner race cage ring and the outer race cage ring including first cam accommodating parts that hold the first cams, second cam accommodating parts adjacent the first cam accommodating parts in a disengaging direction of the first cams and holding the second cams, and brace parts between the first and second cam accommodating parts, the brace parts including a tapering cam posture change part at one end on a rear side in a moving direction of the cage ring such as to increase in width toward the rear side.

5. The cam clutch according to claim 3, wherein one of the inner race cage ring and the outer race cage ring has a flange part radially extending outward at one end on a rear side in a moving direction of the cage ring, and
    the other one of the inner race cage ring and the outer race cage ring has a mating part configured to be complementary to the flange part.

6. The cam clutch according to claim 5, wherein the mating part has circumferentially facing inner side faces that are tapered to increase in distance therebetween toward the rear side in the moving direction of the cage ring.

7. The cam clutch according to claim 2, wherein the first cams and the second cams have a substantially figure-eight shape with a constricted part at a radial center,
    the first cams and the second cams having side faces formed as curved surfaces along circular arcs having a same center and in contact with the inner race cage ring on an inner race side of the constricted part, and
    side faces formed as curved surfaces along circular arcs having a same center and in contact with the outer race cage ring on an outer race side of the constricted part.

* * * * *